(12) United States Patent
Shimizu

(10) Patent No.: US 6,517,461 B2
(45) Date of Patent: Feb. 11, 2003

(54) INFINITELY VARIABLE TRANSMISSION

(75) Inventor: Hirofumi Shimizu, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/923,538

(22) Filed: Aug. 8, 2001

(65) Prior Publication Data

US 2002/0055408 A1 May 9, 2002

(30) Foreign Application Priority Data

Sep. 14, 2000 (JP) ........................................ 2000-279993

(51) Int. Cl.⁷ .............................................. F16H 37/02
(52) U.S. Cl. ....................................................... 475/216
(58) Field of Search ................................. 475/207, 211, 475/215, 216, 218

(56) References Cited

U.S. PATENT DOCUMENTS

| | | | | |
|---|---|---|---|---|
| 4,693,134 A | * | 9/1987 | Kraus ........................... | 475/216 |
| 4,768,398 A | * | 9/1988 | Greenwood .................. | 475/216 |
| 5,720,678 A | * | 2/1998 | Bennett ........................ | 475/216 |
| 5,925,039 A | | 7/1999 | Landingham ................. | 606/41 |
| 5,935,039 A | * | 8/1999 | Sakai et al. ................... | 476/10 |
| 6,306,059 B1 | * | 10/2001 | Yamada ....................... | 475/216 |

FOREIGN PATENT DOCUMENTS

| | | |
|---|---|---|
| JP | 9-210175 | 8/1997 |
| JP | 10-220551 | 8/1998 |
| JP | 11-63139 | 3/1999 |

* cited by examiner

*Primary Examiner*—Sherry Estremsky
(74) *Attorney, Agent, or Firm*—Foley & Lardner

(57) ABSTRACT

In an infinitely variable transmission (IVT) for use with a vehicle, an output gear (3B) of a fixed speed ratio transmission (3) is joined to a planet carrier (5B) of a planetary gear set (5), and a gear (4A) which outputs the rotation of a continuously variable transmission (2) is joined to a sun gear (5A) of the planetary gear set (5). A ring gear (5C) of the planetary gear set (5) is joined to an IVT output gear (7) via a final output shaft (6). The gears are made of helical gears, and the tooth trace directions of the gears are set so that when a torque for driving the vehicle forward is transmitted from the engine to the drive shaft (11), the thrust force acting on the IVT output gear (7) is opposite to the thrust force acting on the ring gear (5C).

12 Claims, 16 Drawing Sheets

INFINITELY VARIABLE TRANSMISSION

FIELD OF THE INVENTION

This invention relates to helical gears used for an infinitely variable transmission for vehicles.

BACKGROUND OF THE INVENTION

An infinitely variable transmission (IVT) for vehicles which combines a fixed speed ratio transmission and a planetary gear set with a continuously variable transmission (CVT) in order to expand the speed change region of the continuously variable transmission (CVT) is disclosed in U.S. Pat. No. 5,935,039 as well as in Tokkai Hei 9-210175 published in 1997, Tokkai Hei 10-220551 published in 1998, and Tokkai Hei 11-63139 published in 1999 respectively by the Japanese Patent Office.

SUMMARY OF THE INVENTION

In these IVT, helical gears are used for the gears of the planetary gear set, the output gears of the fixed speed ratio transmission and CVT, respectively to suppress noise and vibration. The helical gears generate a thrust force according to the turning direction of the tooth trace, and the transfer direction of the torque.

Therefore, depending on the direction of the turning direction of the tooth trace of the helical gears, the thrust force generated by the gears due to torque transmission may be concentrated in one direction. Such a concentration of the thrust force lowers the durability of the bearings supporting the thrust force, increases the friction of the gears, and adversely affects the power transmission efficiency of the IVT.

Moreover, if the bearings are made larger in order to bear the thrust force, the size of IVT will increase.

It is therefore an object of this invention to prevent concentration of the thrust force in the IVT.

In order to achieve the above object, this invention provides an infinitely variable transmission interposed between an engine and a drive shaft of a vehicle to transmit an engine torque to the drive shaft, comprising a first shaft joined to the engine, a second shaft disposed parallel to the first shaft, a fixed speed ratio transmission comprising a first rotation element supported on the second shaft which outputs the rotation of the first shaft at a fixed speed ratio, a continuously variable transmission comprising a second rotation element supported on the second shaft which outputs the rotation of the first shaft at an arbitrary speed ratio, a planetary gear set disposed between the first rotation element and the second rotation element, a final output gear, and a transmitting gear.

The first rotation element and second rotation element are supported free to rotate relative to each other.

The planetary gear set comprises a sun gear joined to the second rotation element, a planet carrier joined to the first rotation element and a ring gear which varies a rotation direction and a rotation speed according to a rotation speed difference between the sun gear and the planet carrier.

The planet carrier supports a planet gear which is meshed with the sun gear and the ring gear, and revolves around the sun gear together with the planet carrier.

The sun gear, ring gear, planet gear, final output gear and transmitting gear are helical gears.

The final output gear is joined to the ring gear and disposed between the planetary gear set and second rotation element.

The transmitting gear meshes with the final output gear and transmits a rotation of the final output gear to the drive shaft.

The ring gear and the final output gear have tooth traces with which, when a torque is transmitted from the engine to the drive shaft, a thrust force exerted by the planet gear on the ring gear and a thrust force exerted by the transmitting gear on the final output gear act in opposite directions.

The details as well as other features and advantages of this invention are set forth in the remainder of the specification and are shown in the accompanying drawings.

DESCRIPTION OF THE PREFERRED EMBODIMENTS

Figure 1:
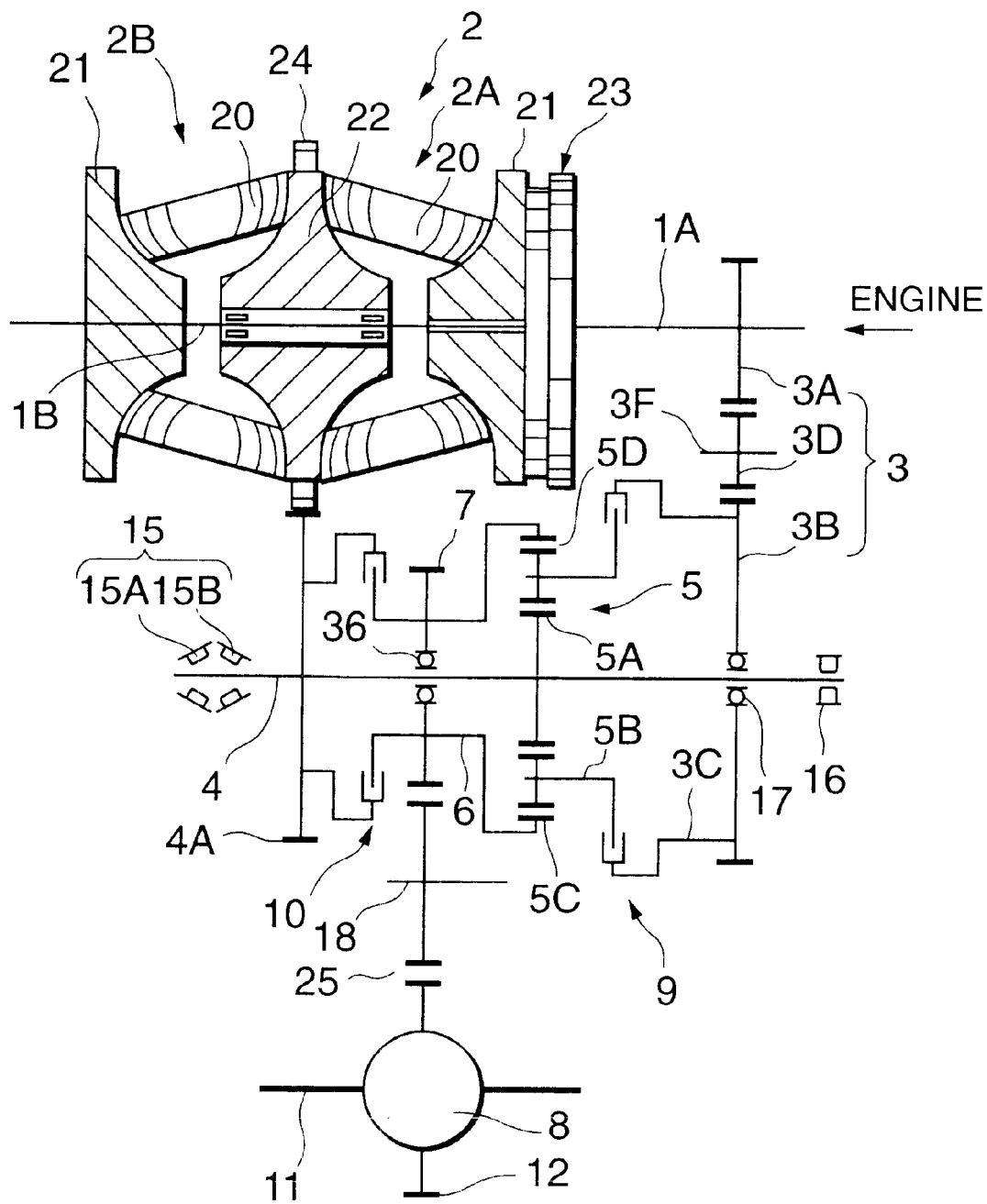
FIG. 1 is a schematic diagram of an infinitely variable transmission (IVT) according to this invention.

Referring to FIG. 1 of the drawings, an infinitely variable transmission for vehicles (referred to hereafter as IVT) comprises an input shaft 1A, a toroidal continuously variable transmission (referred to hereafter as toroidal CVT) 2, a fixed speed ratio transmission 3, a planetary gear set 5, and a final output shaft 6.

The toroidal CVT 2 comprises a CVT shaft 1B and two pairs of input disks 21 and output disks 22. The CVT shaft 1B is disposed coaxially with the input shaft 1A, and rotates together with the input shaft 1A via a loading cam apparatus 23.

Figure 2:
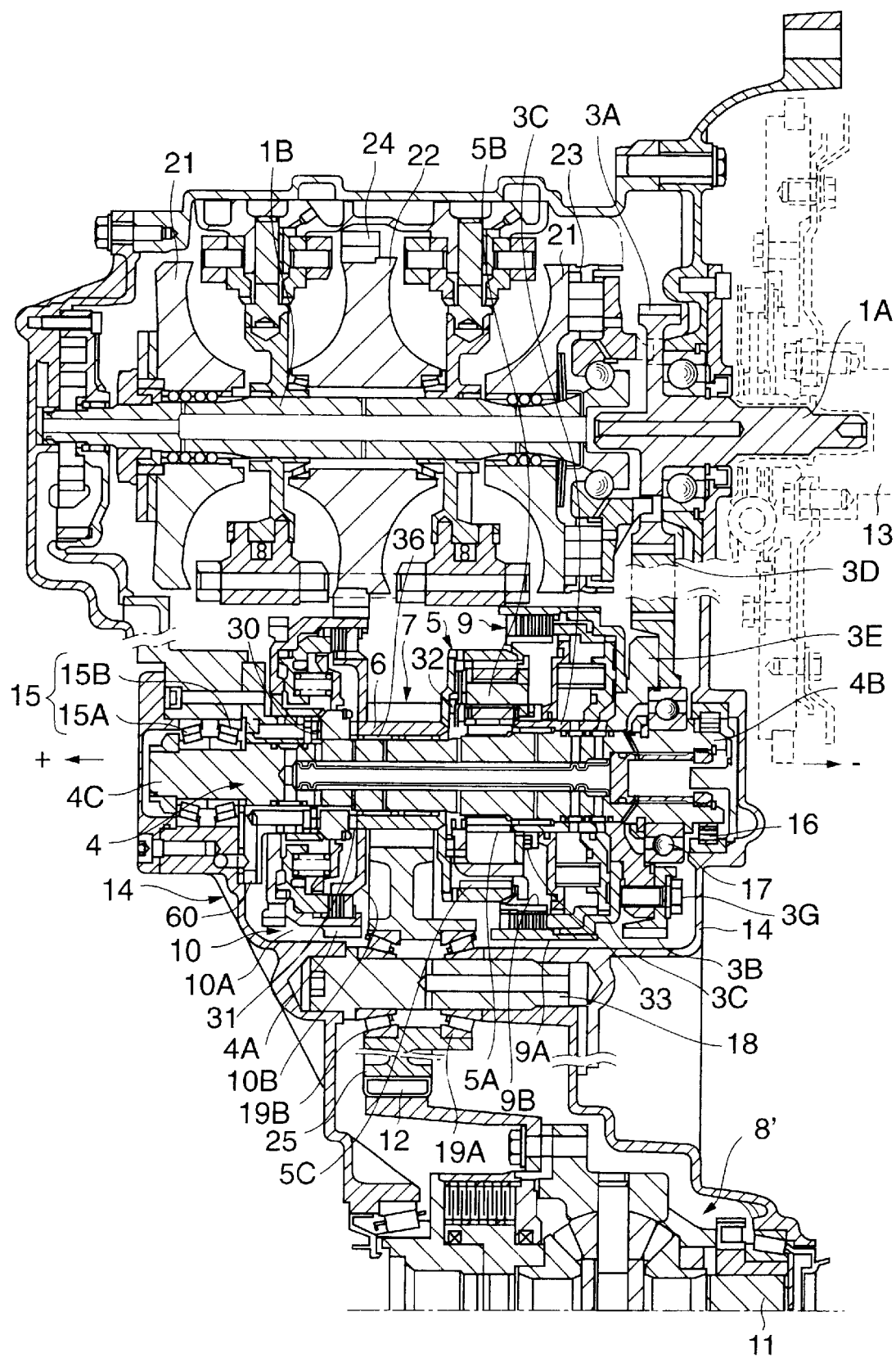
FIG. 2 is a longitudinal sectional view of the IVT.

The input shaft 1 is connected to a crankshaft 13 of the engine shown in FIG. 2. The input disks 21 rotate together with the CVT shaft 1B.

The two output disks 22 are formed in one piece, and are supported free to rotate relative to the CVT shaft 1B. A pair of power rollers 20 are gripped between each pair of the input disk 21 and the output disk 22. A rotation is transmitted from the input disks 21 to the input disks 22 according to the gyration angle of the power rollers 20 at an arbitrary speed ratio. The rotation of the output disks 22 is transmitted to a gear 4A fixed to a CVT output shaft 4 via a CVT output gear 24.

The fixed speed ratio transmission 3 comprises an input gear 3A which rotates together with the input shaft 1A, an intermediate gear 3D, an output gear 3B and an output shaft 3C. The intermediate gear 3D is supported by an independent shaft 3F. The intermediate gear 3D engages with the input gear 3A and output gear 3B. The output gear 3B is supported on the CVT output shaft 4 via a ball bearing 17. The output shaft 3C is fixed to the output gear 3B. The output shaft 3C is a hollow shaft formed coaxially outside the CVT output shaft 4 and is supported free to rotate on the CVT output shaft 4 via a radial needle bearing. The fixed speed ratio transmission 3 transmits a rotation from the input gear 3A to the output gear 3B under a fixed speed ratio.

A planetary gear set 5 comprises a sun gear 5A, planet gears 5D, a carrier 5B and a ring gear 5C. The sun gear 5A is an outer tooth gear fixed to the CVT output shaft 4. The ring gear 5C is an inner tooth gear disposed coaxially outside the sun gear 5A. The planet gears 5D comprise plural pinions which mesh with the outer teeth of the sun gear 5A and the inner teeth of the ring gear 5C. The carrier 5B supports the planet gears 5D free to travel along the outer circumference of the sun gear 5A and inner circumference of the ring gear 5C. The carrier 5B is connected to the output shaft 3C of the fixed speed ratio transmission 3 via a power recirculation clutch 9. The ring gear 5C is connected to one end of a final output shaft 6 supported via a radial bearing 36 on the CVT output shaft 4. The other end of the final output shaft 6 is connected to the gear 4A via a direct clutch 10.

An IVT output gear 7 is fixed to the outer circumference of the final output shaft 6. The IVT output gear 7 is disposed between the planetary gear set 5 and direct clutch 10.

The rotation of the IVT output gear 7 is input to a differential 8 via a counter gear 25 and final gear 12, and is transmitted to left and right drive shafts 11 which drive the drive wheels of the vehicle. The counter gear 25 is supported by a counter shaft 18 fixed to a casing 14 of the IVT, via taper roller bearings 19A, 19B.

This IVT can transmit torque in two types of power transmission mode, i.e., a direct mode wherein the power recirculation clutch 9 is released and direct clutch 10 is engaged, and a power recirculation mode wherein the power recirculation clutch 9 is engaged and the direct clutch 10 is released.

In the direct mode, the rotation of the engine is directly output from the toroidal CVT to the IVT output gear 7 via the gear 4A and the final output shaft 6. Therefore, the rotation direction of the IVT output gear 7 in this case is fixed, and the rotation speed varies according to the speed ratio of the toroidal CVT 2. The direct mode is applied when the vehicle is moving forward at high speed.

In the power recirculation mode, the rotation of the engine is transmitted to the carrier 5B under a fixed speed ratio via the fixed speed ratio transmission 3, and is also transmitted to the sun gear 5A at an arbitrary speed ratio via the toroidal CVT 2. As a result, the ring gear 5C rotates according to the relative rotation of the sun gear 5A and carrier 5B.

The rotation of the ring gear 5C is transmitted to the IVT output gear 7 via the final output shaft 6. The rotation direction and rotation speed of the IVT output gear 7 therefore vary according to the speed ratio of the toroidal CVT 2, which determines the rotation speed of the sun gear 5A. The power recirculation mode is applied when the vehicle is moving forward at low speed or moving backward. By maintaining the toroidal CVT 2 at a specific speed ratio, the ring gear 5C stops rotating and the IVT output gear 7 does not rotate, i.e., the vehicle is kept in a stationary state.

Next, referring to FIG. 2, the IVT is housed in the casing 14. One end of the CVT output shaft 4 is supported in the casing 14 by a bearing unit 15 comprising taper roller bearings 15A, 15B. The other end 4B of the CVT output shaft 4 is supported in the casing 14 by a radial bearing 16. The taper roller bearing 15A supports a thrust force applied to the CVT output shaft 4 in the left hand direction of the figure, and the taper roller bearing 15B supports a thrust force applied to the CVT output shaft 4 in the right hand direction of the figure. In the following description, the thrust force acting in the left hand direction of FIG. 2 will be referred to as a positive thrust force, and the thrust force acting in the right hand direction of FIG. 2 will be referred to as a negative thrust force.

A flange 3E is fixed to the output shaft 3C of the fixed speed ratio transmission 3. The output gear 3B is fixed to the flange 3E by a bolt 3G.

The power recirculation clutch 9 comprises a clutch drum 9A fixed to the output shaft 3C, and a hub 9B fixed to the carrier 5B of the planetary gear set 5. The clutch drum 9A and hub 9B comprise clutch plates operated by oil pressure, and the clutch drum 9A, hub 9B either transmit rotation therebetween via these clutch plates, or rotate freely relative to each other according to the engagement and disengagement of the clutch plates.

The direct clutch 10 comprises a clutch drum 10A splinejointed to the outer circumference of the CVT output shaft 4, and a hub 10B fixed to the final output shaft 6. Clutch plates operated by oil pressure are provided in the clutch drum 10A and hub 10B, the clutch drum 10A and hub 10B either transmitting rotation therebetween via these clutch plates or rotating freely relative to each other according to the engagement and disengagement of the clutch plates. The gear 4 is formed on the outer circumference of the clutch drum 10A.

The input gear 3A, intermediate gear 3D and output gear 3B of the fixed speed ratio transmission 3, the sun gear 5A, planet gears 5D and ring gear 5C of the planetary gear set 5, and the IVT output gear 7, counter gear 25 and final gear 12 are all helical gears.

To support these gears, the IVT comprises five parallel rotating shafts in the casing 14, i.e., a rotation shaft comprising the input shaft 1A and CVT shaft 1B, an independent shaft 3F which supports the intermediate gear 3D of the fixed speed ratio transmission 3, the CVT output shaft 4, the counter shaft 18 which supports the counter gear 25, and a drive shaft 11.

From the left hand side to the right hand side of FIG. 2, the bearing unit 15, an oil retainer 60, clutch drum 10A of the direct clutch 10, final output shaft 6, planetary gear set 5, power circulation clutch 9, and output shaft 3C and output gear 3B of the fixed speed ratio transmission 3 are arranged in this order on the outer circumference of the CVT output shaft 4.

Figure 3:
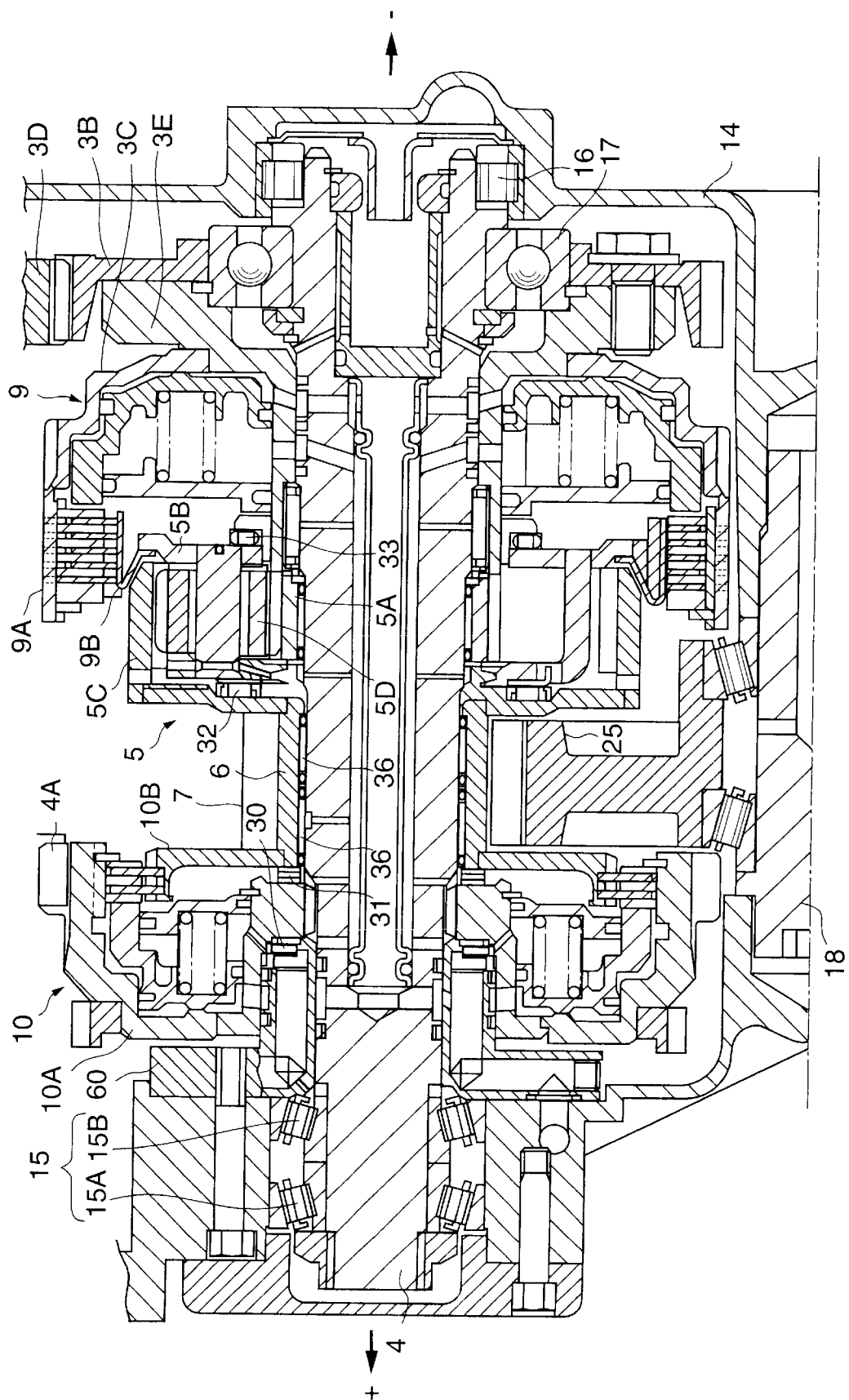
FIG. 3 is an enlarged longitudinal sectional view of the main part of the IVT.

Next, referring to FIG. 3, the oil retainer 60 is fixed to the casing 14, and a passage is formed inside it to supply a high oil pressure to operate the power recirculation clutch 9 and direct clutch 10 via a hollow part of the CVT output shaft 4.

A needle bearing 30 is disposed between the oil retainer 60 and the clutch drum 10A of the direct clutch 10. The needle bearing 30 supports a positive thrust force which acts on the clutch drum 10A. A needle bearing 31 is disposed between the clutch drum 10A and final output shaft 6. The needle bearing 31 supports a negative thrust force acting on the clutch drum 10A.

A needle bearing 32 is disposed between the ring gear 5C and the carrier 5B of the planetary gear set 5. The needle bearing 32 supports a negative thrust force acting on the final output shaft 6. A needle bearing 33 is disposed between the carrier 5B and the output shaft 3C of the fixed speed ratio transmission 3. The needle bearing 33 supports a negative thrust force acting on the carrier 5B.

The ball bearing 17 which supports the output gear 3B of the fixed the ratio transmission 3 on the CVT output shaft 4 comprises a deep groove ball bearing, and supports not only the radial force but also the thrust force acting on the output gear 3B.

As a result of this thrust force supporting construction, the negative thrust force acting on the output shaft 3C of the fixed speed ratio transmission 3 is transmitted from the ball bearing 17 to the CVT output shaft 4 via the flange 3E, and is finally supported by the taper roller bearing 15B of the bearing unit 15.

As a result, the negative thrust force acting on the IVT output gear 7 or ring gear 5C is transmitted to the rotation shaft 3C via the needle bearing 32, carrier 5B and needle bearing 33, and is also supported by the taper roller bearing 15B due to the above path.

On the other hand, the positive thrust force acting on the planetary gear set 5 is supported by the casing 14 via the final output shaft 6, needle bearing 31, clutch drum 10A, needle bearing 30 and oil retainer 60.

As a result, the positive thrust force acting on the output gear 3B of the fixed speed ratio transmission 3 is transmitted to the planetary gear set 5 via the output shaft 3C, needle bearing 33, carrier 5B and needle bearing 32, and is also supported by the casing 14 due to the above path.

The positive thrust force acting on the sun gear 5A is directly transmitted to the taper roller bearing 15A of the bearing unit 15 via the CVT output shaft 4.

Figure 4:
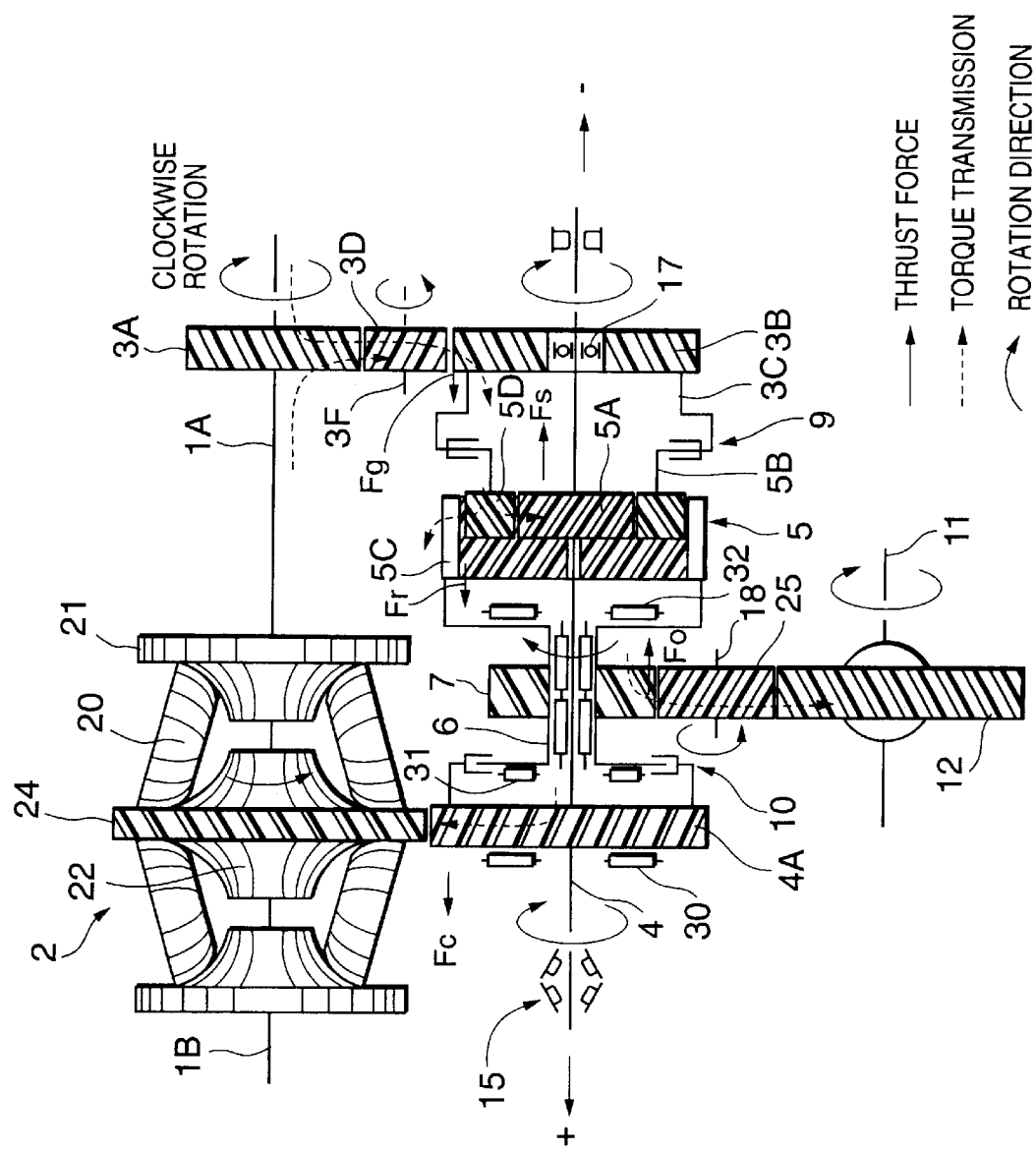
FIG. 4 is a schematic diagram of the IVT describing a setting of a tooth trace of helical gears according to this invention.

Next, referring to FIG. 4, the rotation direction of the shafts and the settings of the tooth traces of the helical gears will be described when the vehicle moves forward in the power recirculation mode.

In the following description, the rotation direction of the input shaft 1A shown by an arrow in the figure is taken as clockwise. The intermediate gear 3D rotates counterclockwise, and the output gear 3B of the fixed speed ratio transmission 3 and carrier 5B of the planetary gear set 5 rotate clockwise.

In the toroidal CVT 2, the rotations of the input disk 21 and output disk 22 are always opposite to each other. Therefore, the CVT output gear 24 rotates counterclockwise, and the gear 4A which meshes with the CVT output gear 24, CVT output shaft 4 and sun gear 5A rotate clockwise.

When the sun gear 5A and the carrier 5B rotate in the same clockwise direction, the rotation direction of the ring gear 5C changes due to the rotation speed ratios of these components. The vehicle moves forward when the rotation speed ratio of the sun gear 5A and the carrier 5B is greater than a predetermined value, and the ring gear 5C rotates in the same clockwise direction as the sun gear 5A. In this case, the final gear 12 rotates clockwise via the counter gear 25.

The torque transmission in this case is expressed as follows.

The rotation torque output from the output gear 3B of the fixed speed ratio transmission 3 to the carrier 5B is transmitted to the ring gear 5C and sun gear 5A. The rotation torque transmitted to the ring gear 5C drives the drive shafts 11 via the differential 8. The torque transmitted to the sun gear 5A is input to the toroidal CVT 2 via the gear 4A and CVT output gear 24, and is recirculated to the input gear 3A of the fixed speed ratio transmission 3 from the output disk 22 via the input disk 21. As a result, in the power recirculation mode, the helical gears of the fixed speed ratio transmission 3 transmit the largest torque of all the helical gears.

In this IVT, the tooth trace direction of the helical gears is determined so that the thrust forces exerted by the helical gears on the CVT output shaft 4 or final output shaft 6 cancel each other out due to the above torque transmission. Regarding the tooth trace direction described below, right hand means a clockwise rotation as the tooth trace moves away from the viewpoint when the gear is viewed from the axial direction. Left hand means an anticlockwise rotation as the tooth trace moves away from the viewpoint when the gear is viewed from the axial direction.

Next, the relation between the direction of the tooth trace of the helical gears and the direction of the thrust force will be described referring to FIGS. 16A, 16B. It will be assumed that the relations between positive or negative thrust force and the rotation directions of the gears are those of FIGS. 2 and 4.

Figure 16A:
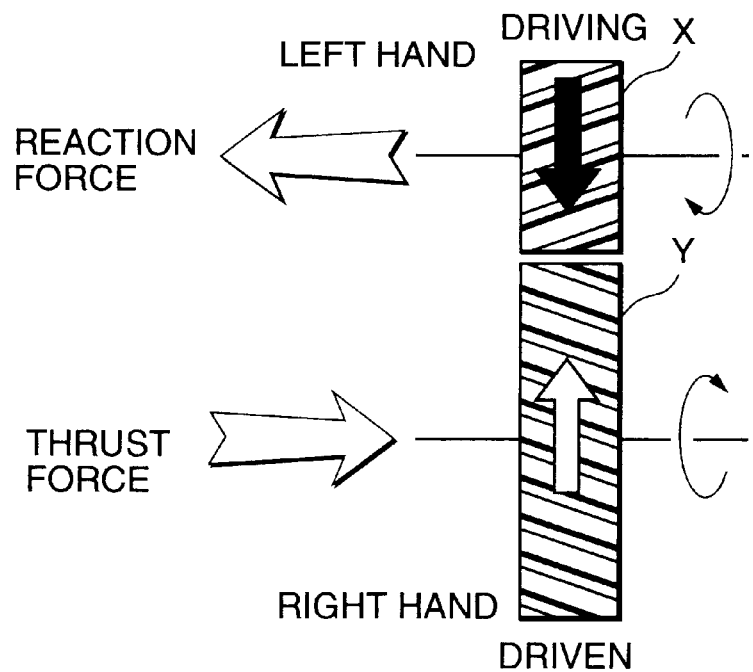
FIGS. 16A and 16B are diagrams describing the relation of a tooth trace of helical gears, and thrust force.

As shown in FIG. 16A, when a drive gear X is left hand while a driven gear Y is right hand, and the drive gear X rotates anticlockwise, a positive thrust force acts on the driven gear Y, and a negative thrust force acts on the drive gear X as a reaction.

Figure 16B:
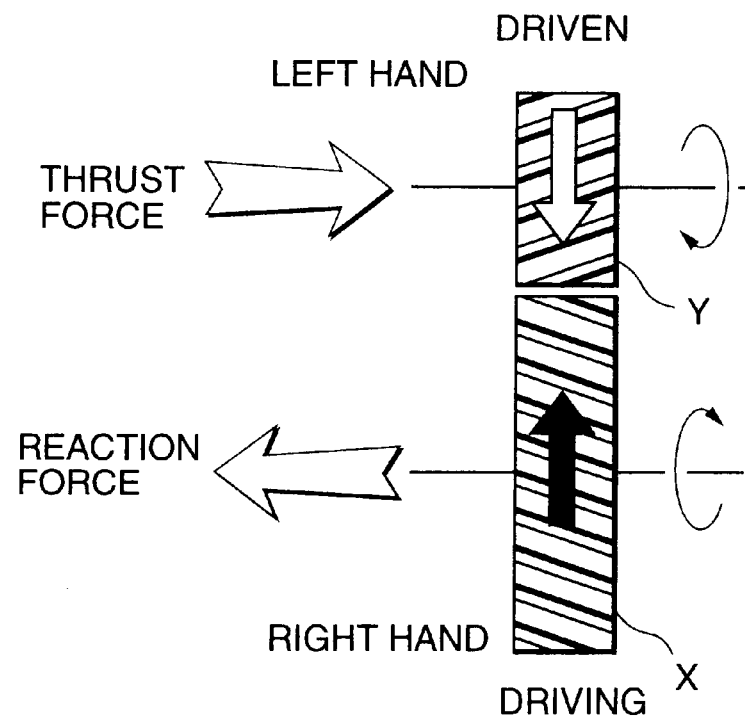

As shown in FIG. 16B, when the drive gear X is right hand while the driven gear Y is left hand, and the drive gear X rotates clockwise, a negative thrust force acts on the driven gear Y, and a positive thrust force acts on the drive gear X as a reaction.

Due to the above relations, in this IVT, the output gear 3B of the fixed speed ratio transmission 3 is set to left hand, the IVT output gear 7 is set to left hand and the gear 4A is set to right hand. Correspondingly, the input gear 3A of the fixed speed ratio transmission 3 is set to left hand, the intermediate gear 3D is set to right hand, the CVT output gear 24 is set to left hand, the counter gear 25 is set to right hand and the final gear 12 is set to left hand.

In the planetary gear set 5, the sun gear 5A is set to right hand, the ring gear 5C is set to left hand and correspondingly, the planet gears 5D are set to left hand. The reason why the tooth traces of the ring gear 5C and planet gears 5D are both set in the same direction is because the ring gear 5C is an inner tooth gear. The other gears are all outer tooth gears. This is the same as the reason why, although the tooth traces of the sun gear 5A and ring gear 5C are set in different directions, the slope of the slanting lines of these gears in FIG. 4 is the same.

With the above tooth trace arrangement, the thrust forces acting on the helical gears in the CVT output shaft 4 while the vehicle is moving forward in the power recirculation mode are summarized in the following Table 1. The directions in which the thrust forces in Table 1 act follows positive and negative shown in FIGS. 2 and 4.

TABLE 1

|  | Gear 4A | IVT output Gear 7 | Ring gear 5C | Sun gear 5A | Output gear 3B |
|---|---|---|---|---|---|
| Thrust force | Fc | Fo | Fr | Fs | Fg |
| Tooth trace direction | right hand | left hand | left hand | right hand | left hand |
| Thrust force direction | positive | negative | positive | negative | positive |
| Torque transmission | driving | driving | driven | driven | driven |
| Rotation direction | clockwise | clockwise | clockwise | clockwise | clockwise |

Describing the transmission of thrust force between the above helical gears, the IVT output gear 7 and ring gear 5C are connected via the final output shaft 6, the ring gear 5C and sun gear 5A are connected via the meshing of the helical gears including the planet gears 5D, and the sun gear 5A and output gear 3B of the fixed speed ratio transmission 3 are connected via the CVT output shaft 4 and the ball bearing 17.

On the other hand, the gear 4A is spline-jointed to the CVT output shaft 4, and comes in contact with the final output shaft 6 via the needle bearing 31. As a result, when a thrust force Fc is negative, the thrust force Fc is transmitted to the final output shaft 6 from the gear 4A, but when it is positive, the thrust force Fc is not transmitted to the final output shaft 6 and is supported by the casing 14 via the needle bearing 30 and oil retainer 60.

With respect to the transmission of the thrust forces, therefore, the part from the output gear 3B of the fixed speed ratio transmission 3 to the IVT output gear 7 may be considered as a one-piece construction in this IVT. In other words, a force equal to the sum of the thrust forces acting inside this structure, acts on the CVT output shaft 4. In this structure, as shown in Table 1, the two negative thrust forces Fo, Fs acting on the IVT output gear 7 and sun gear 5A cancel out of the positive thrust forces Fr, Fg acting on the ring gear 5C and output gear 3B. Therefore, the thrust force exerted by this structure on the CVT output shaft 4 is small, and the load on the bearing unit 15 is maintained at a low level.

Further, since the thrust force Fo acting on the IVT output gear 7 and the thrust force Fr acting on the ring gear 5C cancel out each other, the needle bearings 31 and 32 supporting the final output shaft 6 do not suffer a concentration of the thrust forces.

Figure 5:
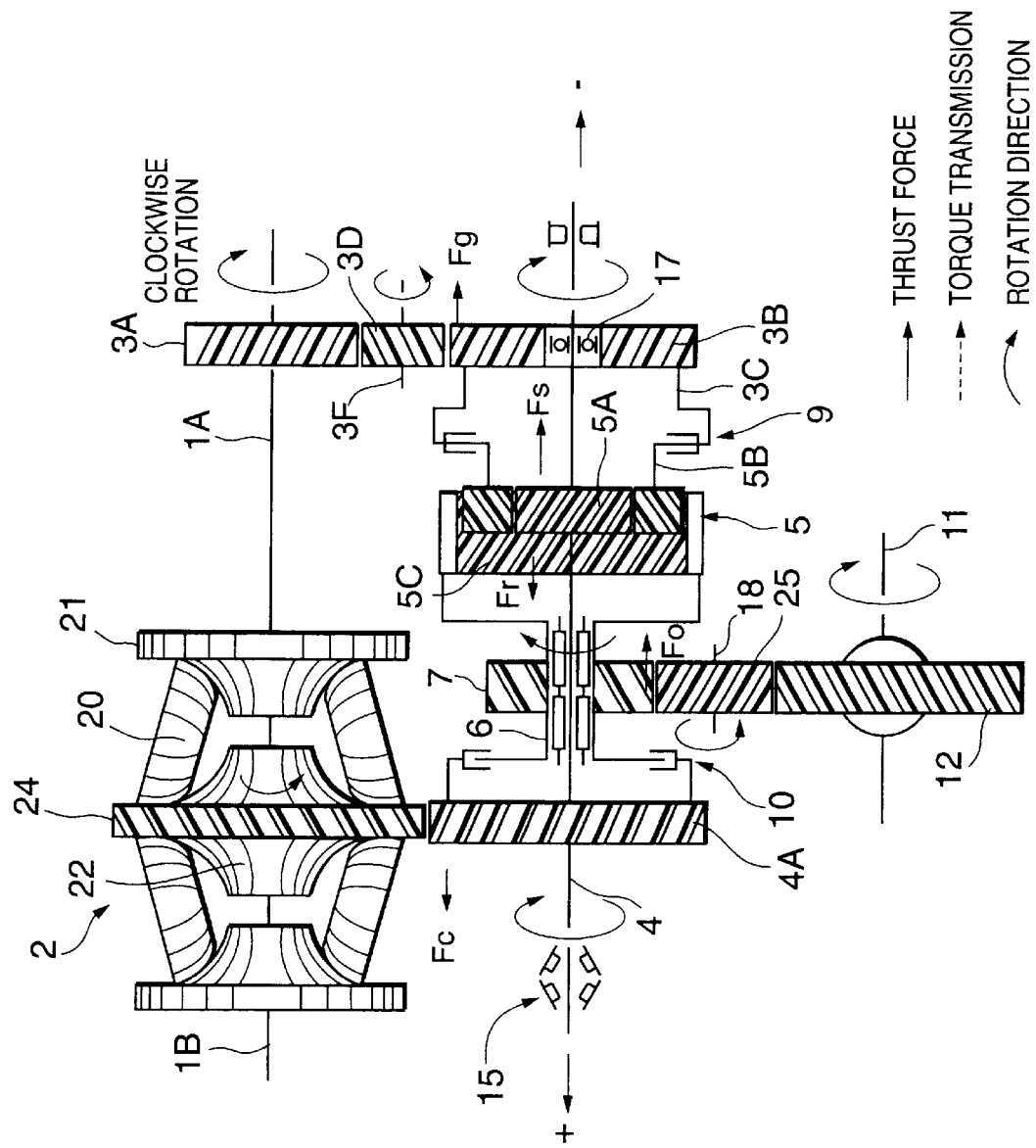
FIG. 5 is similar to FIG. 4, but showing a second embodiment of this invention.

Next, a second embodiment of this invention will be described referring to FIG. 5.

According to this embodiment, the direction of the tooth trace of the output gear 3B of the fixed speed ratio transmission 3 is set to right hand, correspondingly, the tooth trace of the intermediate gear 3D is set to left hand, and the tooth trace of the input gear 3A is changed to right hand. The remaining features of the construction are identical to those of the first embodiment.

The thrust forces acting on the helical gears on the CVT output shaft 4 in this embodiment are summarized in the following Table 2.

TABLE 2

|  | Gear 4A | IVT output Gear 7 | Ring gear 5C | Sun gear 5A | Output gear 3B |
|---|---|---|---|---|---|
| Thrust force | Fc | Fo | Fr | Fs | Fg |
| Tooth trace direction | right hand | left hand | left hand | right hand | right hand |
| Thrust force direction | positive | negative | positive | negative | negative |
| Torque transmission | driving | driving | driven | driven | driven |
| Rotation direction | clockwise | clockwise | clockwise | clockwise | clockwise |

In this embodiment, of the four thrust forces acting in the structure from the output gear 3B to the IVT output gear 7, the positive thrust force Fr acting on the ring gear 5C has the effect of mitigating the remaining three negative thrust forces Fc, Fs. Fg. Therefore, according also to this embodiment, the thrust load exerted by the structure on the CVT output shaft 4 is decreased, and the load on the bearing unit 15 is maintained at a low level.

Figure 6:
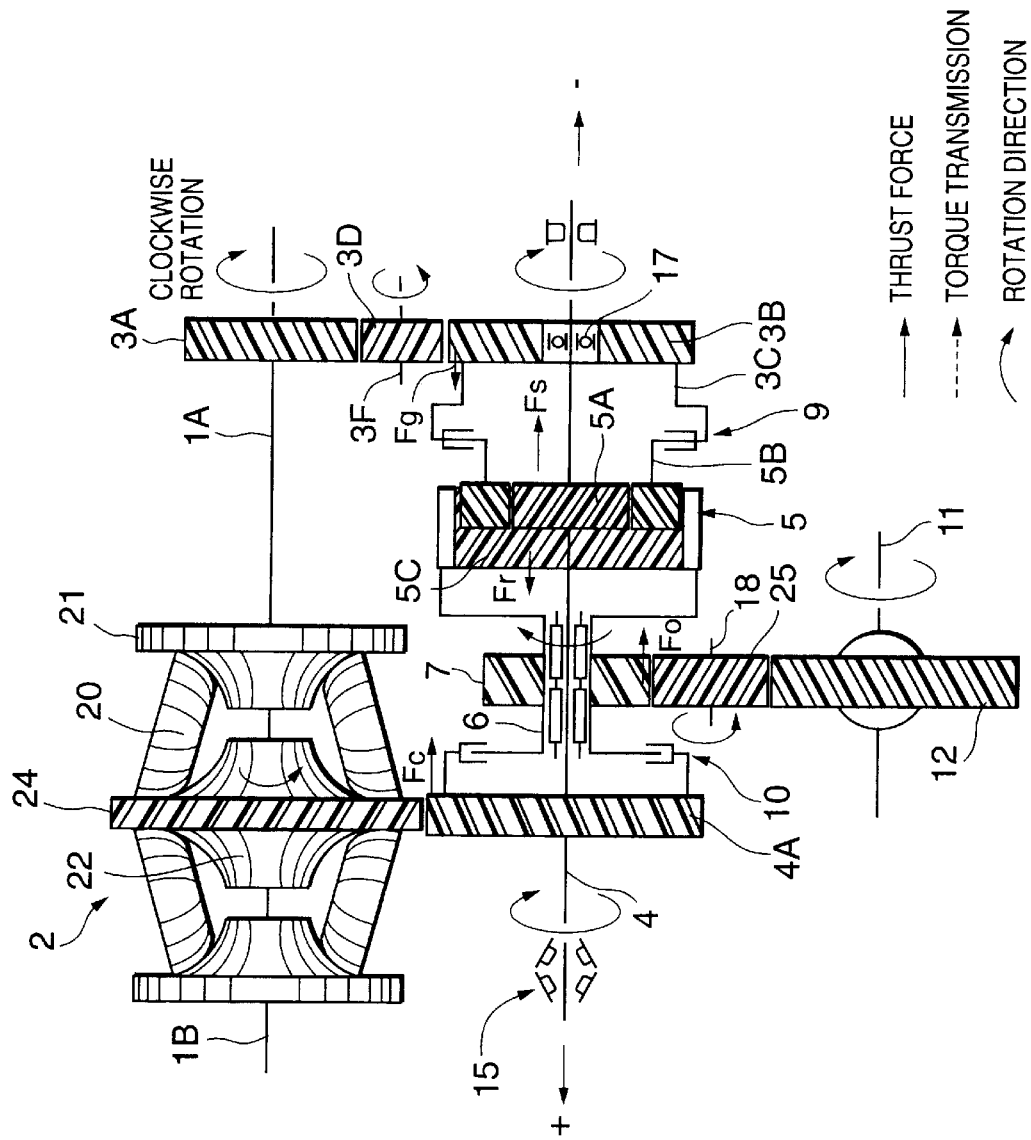
FIG. 6 is similar to FIG. 4, but showing a third embodiment of this invention.

Next, a third embodiment of this invention will be described referring to FIG. 6.

According to this embodiment, the direction of the tooth trace of the gear 4A is changed to left hand, and correspondingly, the tooth trace of the CVT output gear 24 is changed to right hand. The remaining features of the construction are identical to those of the first embodiment.

The thrust forces acting on the helical gears on the CVT output shaft 4 in this embodiment are summarized in the following Table 3.

TABLE 3

|  | Gear 4A | IVT output Gear 7 | Ring gear 5C | Sun gear 5A | Output gear 3B |
|---|---|---|---|---|---|
| Thrust force | Fc | Fo | Fr | Fs | Fg |
| Tooth trace direction | left hand | left hand | left hand | right hand | left hand |
| Thrust force direction | negative | negative | positive | negative | positive |
| Torque transmission | driving | driving | driven | driven | driven |
| Rotation direction | clockwise | clockwise | clockwise | clockwise | clockwise |

In this embodiment, the negative thrust force Fc acting on the gear 4A is transmitted to the final output shaft 6 via the clutch drum 10A and needle bearing 31, so five types of thrust force act on the structure.

The three negative thrust forces cancel out the two positive thrust forces in this embodiment, so the load exerted by the structure on the CVT output shaft 4 is small, and the load on the bearing unit 15 is maintained at a low level.

Since the thrust force Fc acting on the gear 4A is a negative value, the needle bearing 30 disposed between the gear 4A and oil retainer 60 does not suffer a thrust force in this embodiment.

Figure 7:
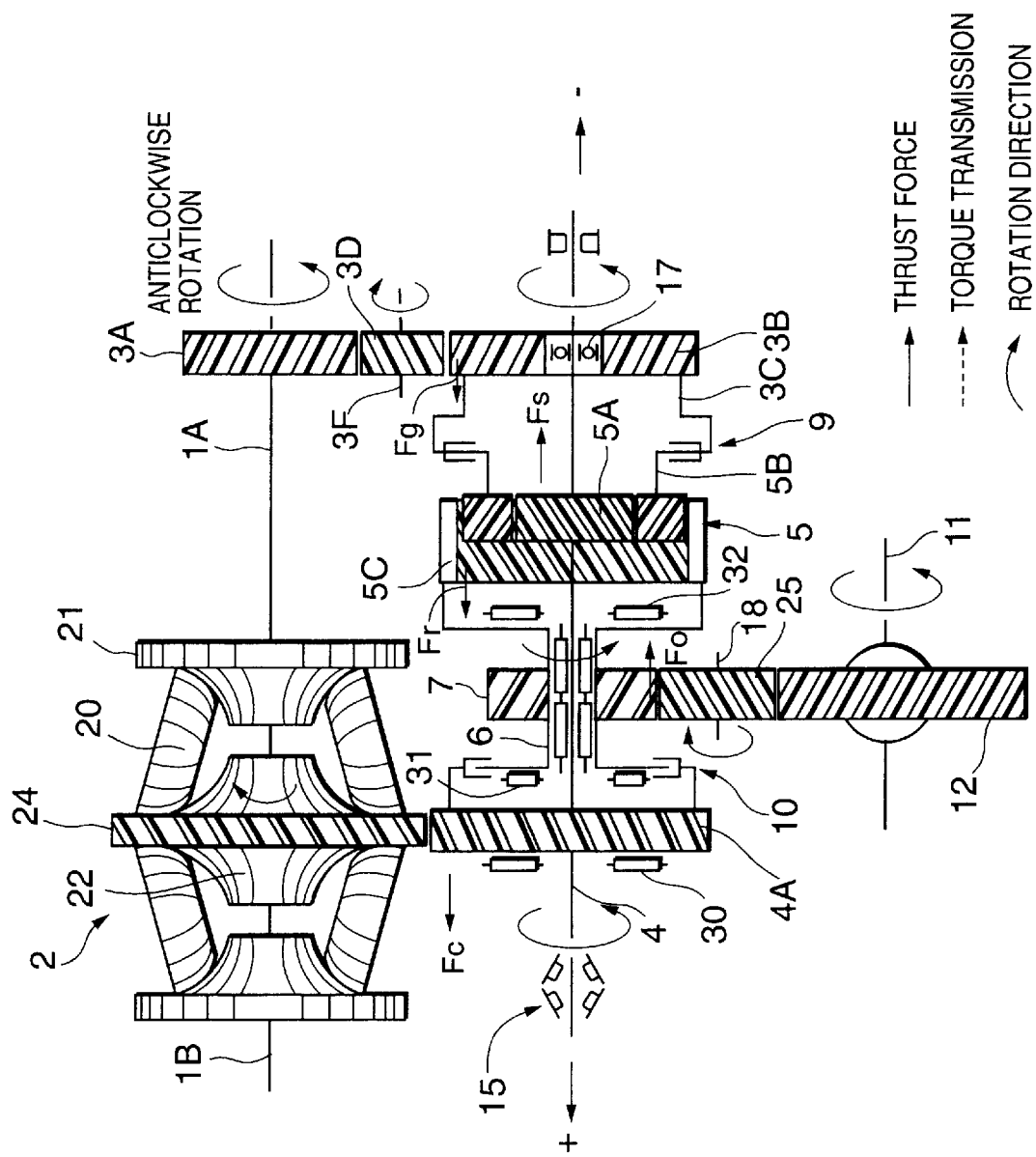
FIG. 7 is similar to FIG. 4, but showing a fourth embodiment of this invention.

Next, a fourth embodiment of this invention will be described referring to FIG. 7.

In this embodiment, the rotation direction of the shafts of the first embodiment are reversed, and the tooth traces of the helical gears are also reversed. The remaining features of the construction are identical to those of the first embodiment.

The thrust forces acting on the helical gears on the CVT output shaft 4 in this embodiment are summarized in the following Table 4.

TABLE 4

|  | Gear 4A | IVT output Gear 7 | Ring gear 5C | Sun gear 5A | Output gear 3B |
|---|---|---|---|---|---|
| Thrust force | Fc | Fo | Fr | Fs | Fg |
| Tooth trace direction | left hand | right hand | right hand | left hand | right hand |
| Thrust force direction | positive | negative | positive | negative | positive |
| Torque transmission | driving | driving | driven | driven | driven |
| Rotation direction | anti-clockwise | anti-clockwise | anti-clockwise | anti-clockwise | anti-clockwise |

In this embodiment, the directions of the tooth traces of the helical gears and rotation direction of the gears are both the opposite of those in the first embodiment, so the directions of the thrust forces acting on the helical gears are identical to those of the first embodiment. Therefore, in this embodiment also, an identical effect to that of the first embodiment is obtained.

Figure 8:
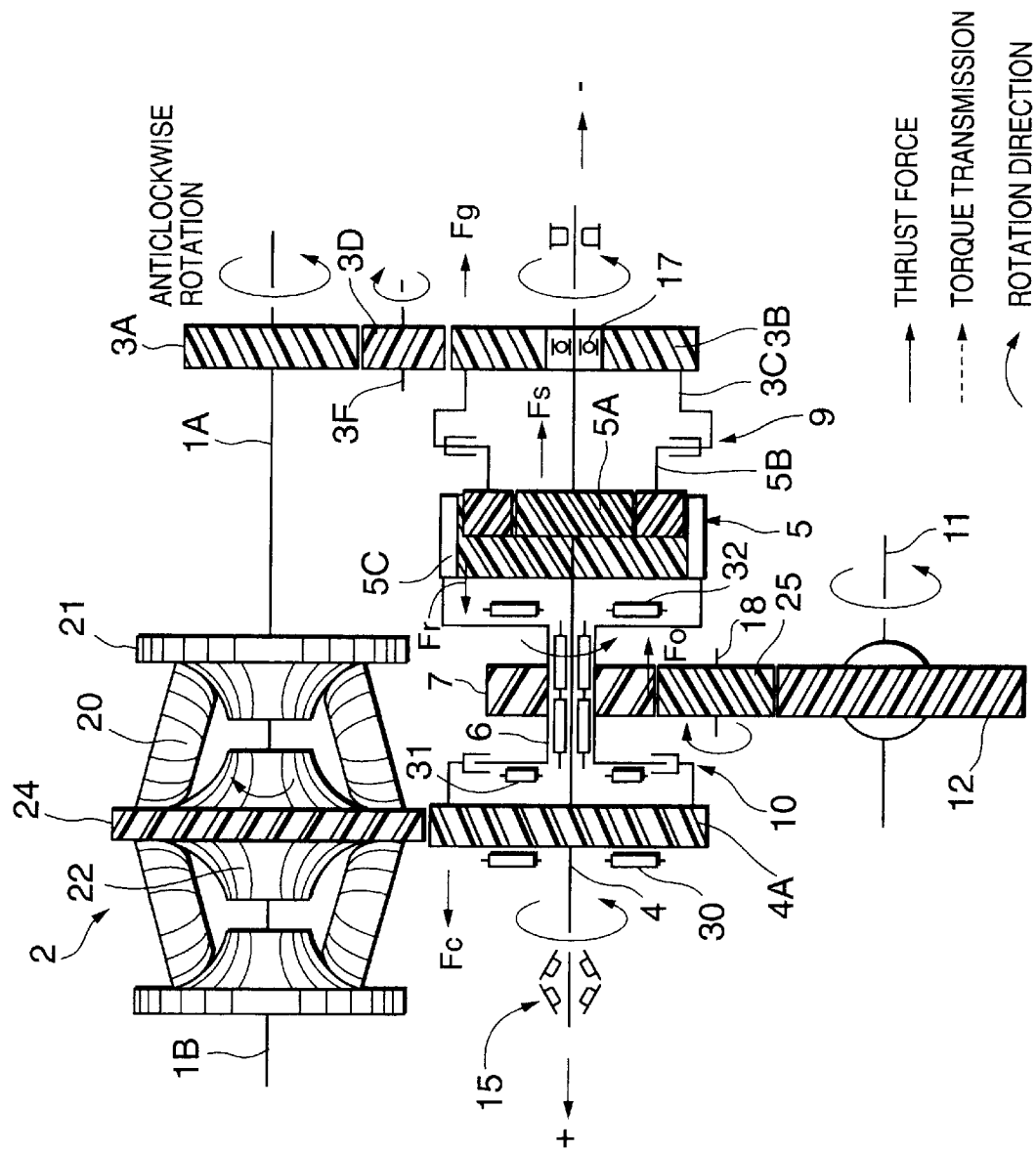
FIG. 8 is similar to FIG. 4, but showing a fifth embodiment of this invention.

Next, a fifth embodiment of this invention will be described referring to FIG. 8.

In this embodiment, the directions of the tooth traces of the gears 3A, 3D and 3B of the fixed speed ratio transmission 3 of the fourth embodiment are reversed. The remaining features of the construction are identical to those of the fourth embodiment.

In this embodiment, the thrust forces acting on the helical gears on the CVT output shaft 4 are summarized in the following Table 5.

TABLE 5

|  | Gear 4A | IVT output Gear 7 | Ring gear 5C | Sun gear 5A | Output gear 3B |
|---|---|---|---|---|---|
| Thrust force | Fc | Fo | Fr | Fs | Fg |
| Tooth trace direction | left hand | right hand | right hand | left hand | left hand |
| Thrust force direction | positive | negative | positive | negative | negative |
| Torque transmission | driving | driving | driven | driven | driven |
| Rotation direction | anti-clockwise | anti-clockwise | anti-clockwise | anti-clockwise | anti-clockwise |

In this embodiment, the directions of the thrust forces acting on the helical gears are identical to those of the second embodiment. Therefore, an identical effect that of the second embodiment is obtained.

Figure 9:
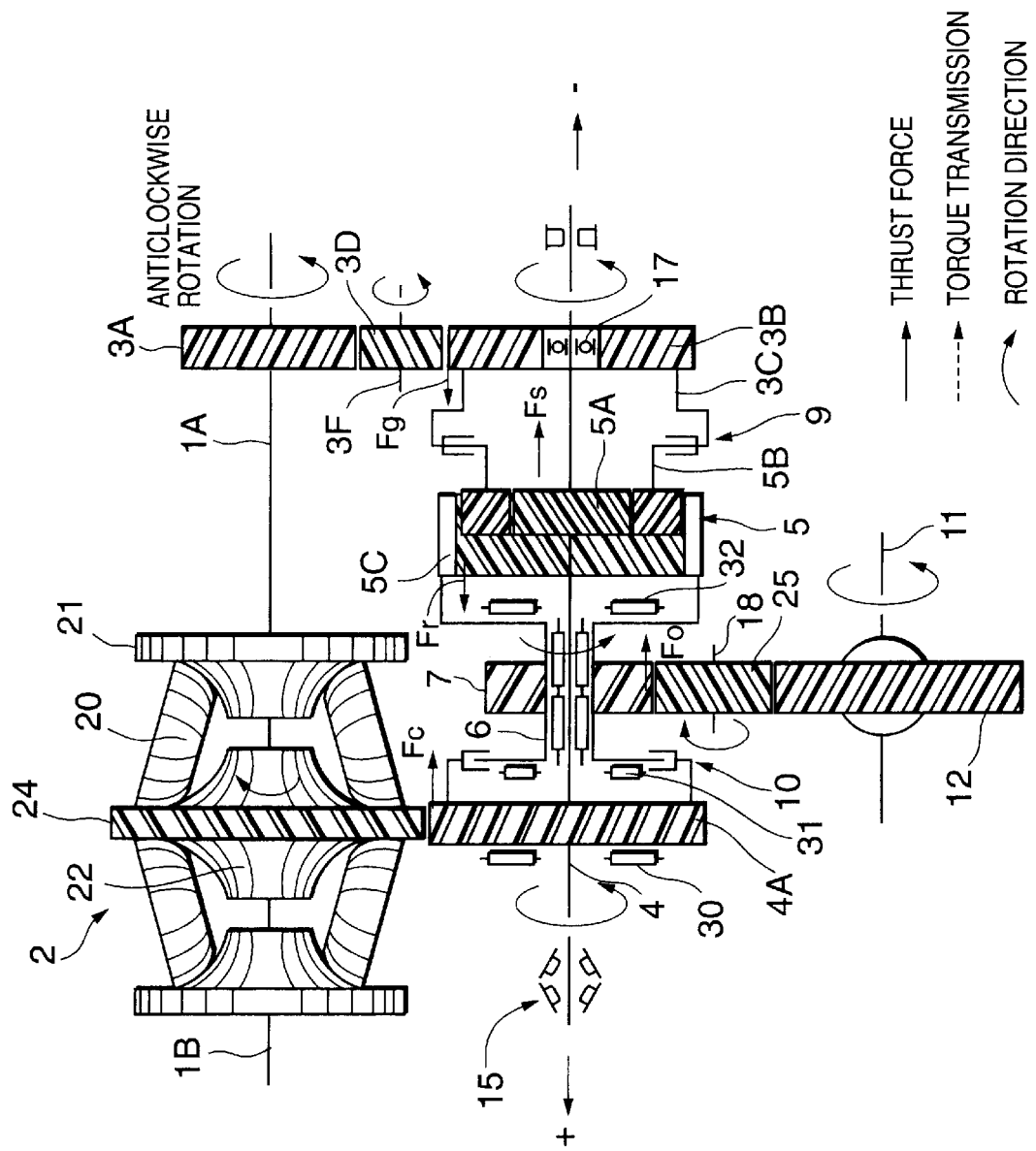
FIG. 9 is similar to FIG. 4, but showing a sixth embodiment of this invention.

Next, a sixth embodiment of this invention will be described referring to FIG. 9.

In this embodiment, the tooth trace of the gear 4A of the fourth embodiment is changed to left hand, and correspondingly, the tooth trace of the CVT output gear 24 is changed to right hand. The remaining features of the construction are identical to those of the fourth embodiment.

The thrust forces acting on the helical gears on the CVT output shaft 4 in this embodiment are summarized in the following Table 6.

TABLE 6

|  | Gear 4A | IVT output Gear 7 | Ring gear 5C | Sun gear 5A | Output gear 3B |
|---|---|---|---|---|---|
| Thrust force | Fc | Fo | Fr | Fs | Fg |
| Tooth trace direction | right hand | right hand | right hand | left hand | right hand |
| Thrust force direction | negative | negative | positive | negative | positive |
| Torque transmission | driving | driving | driven | driven | driven |
| Rotation direction | anti-clockwise | anti-clockwise | anti-clockwise | anti-clockwise | anti-clockwise |

In this embodiment, the directions of the thrust forces acting on the helical gears are the same as those of the third embodiment. Therefore, an identical effect that of the third embodiment is obtained.

Figure 10:
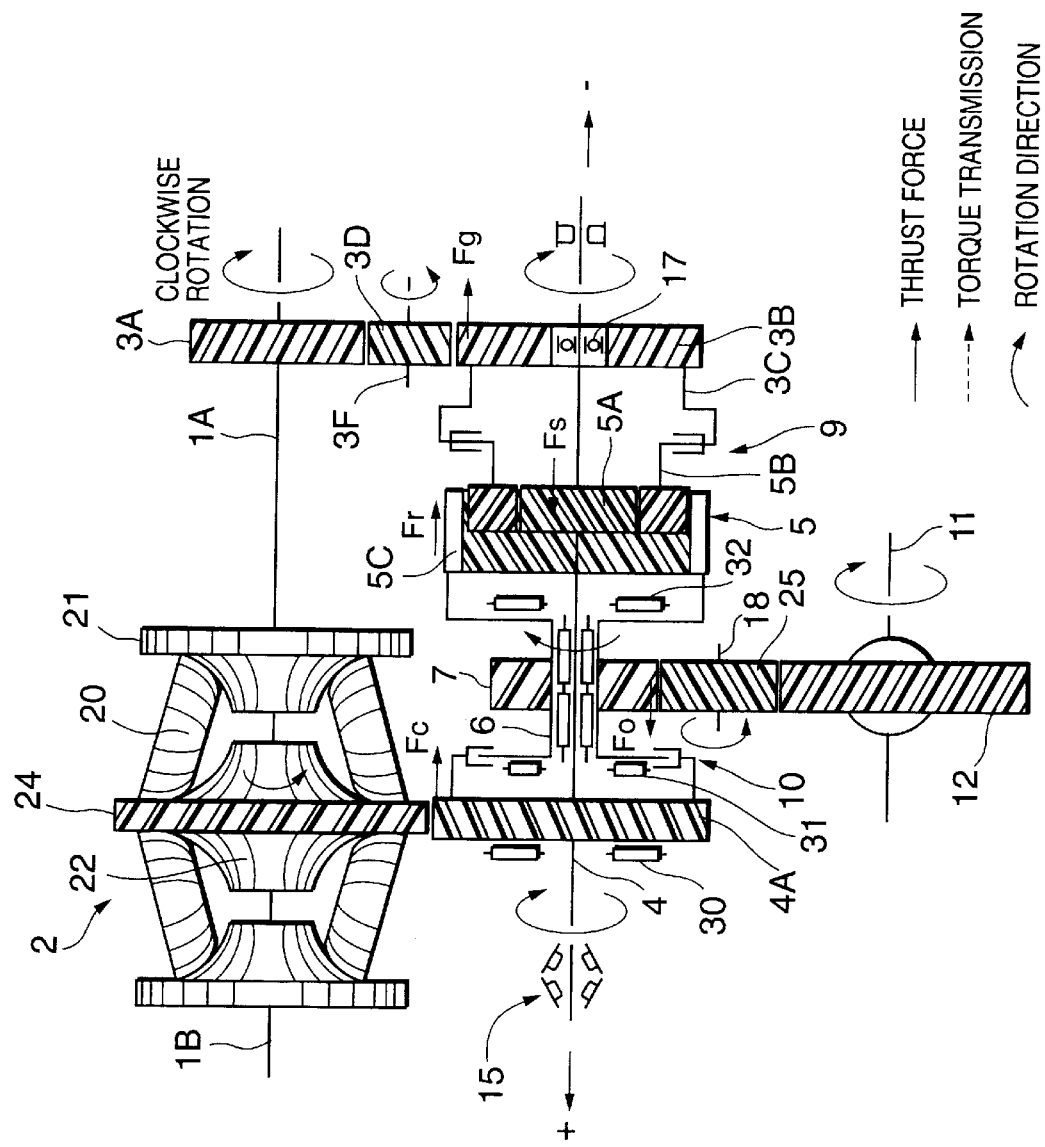
FIG. 10 is similar to FIG. 4, but showing a seventh embodiment of this invention.

Next, a seventh embodiment of this invention will be described referring to FIG. 10.

In this embodiment, the rotation direction of the input shaft IA is identical to that of the first embodiment, but the directions of the tooth traces of all the helical gears are the reverse of those of the first embodiment.

As a result, the helical gears rotate in the same direction as the helical gears of the first embodiment, but the thrust forces acting on the helical gears are opposite to those of the first embodiment.

The thrust forces acting on the helical gears on the CVT output shaft 4 in this embodiment are summarized in the following Table 7.

TABLE 7

|  | Gear 4A | IVT output Gear 7 | Ring gear 5C | Sun gear 5A | Output gear 3B |
|---|---|---|---|---|---|
| Thrust force | Fc | Fo | Fr | Fs | Fg |
| Tooth trace direction | left hand | right hand | right hand | left hand | right hand |
| Thrust force direction | negative | positive | negative | positive | negative |
| Torque transmission | driving | driving | driven | driven | driven |
| Rotation direction | clockwise | clockwise | clockwise | clockwise | clockwise |

In this embodiment, the negative thrust force Fc acting on the gear 4A is transmitted to the structure. As a result, in the structure, the three negative thrust forces Fc, Fr, Fg cancel out the two positive thrust forces Fo, Fs. Therefore, the thrust force exerted by the structure on the CVT output shaft 4 is small, and the load on the bearing unit 15 is maintained at a low level.

Figure 11:
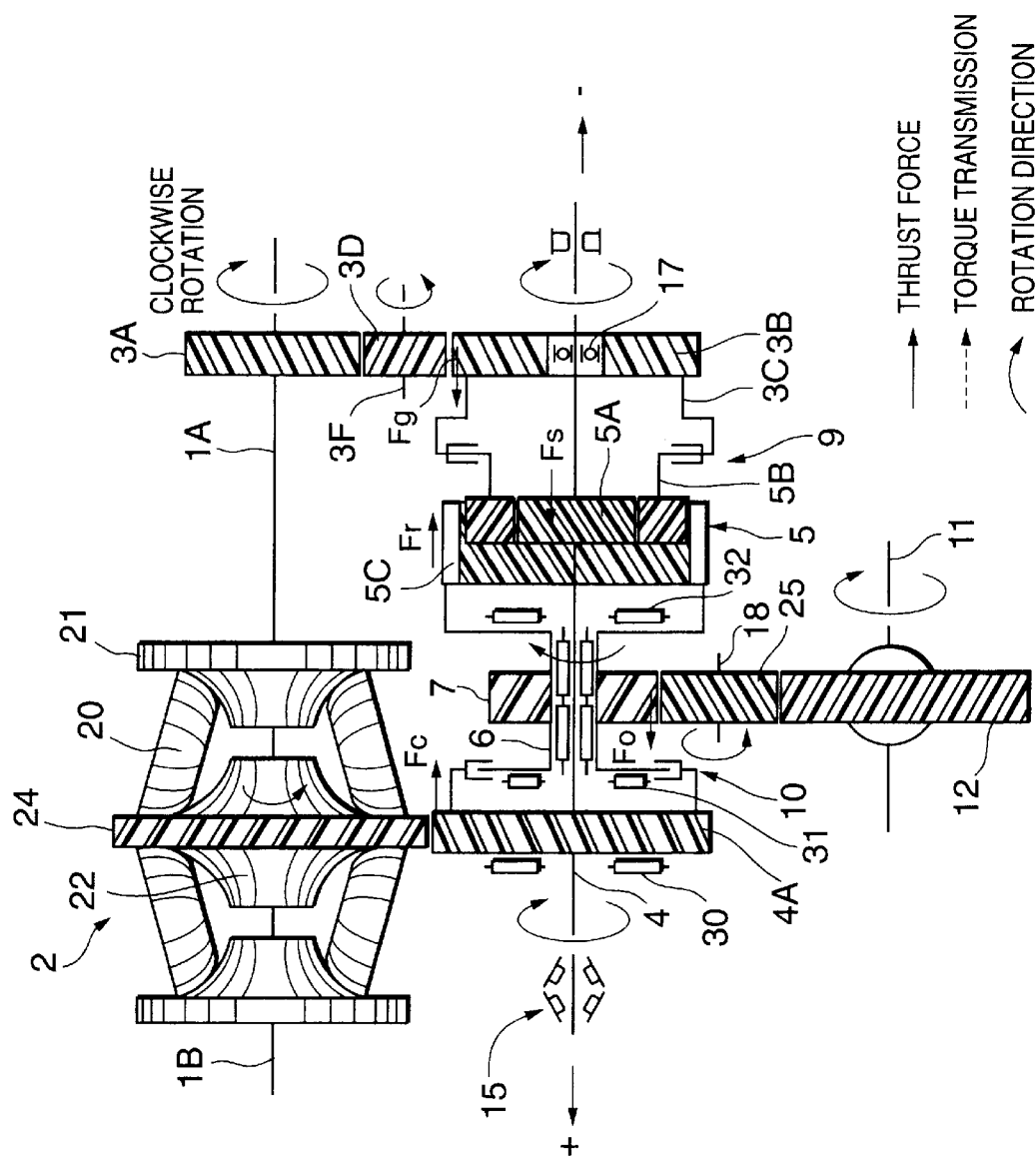
FIG. 11 is similar to FIG. 4, but showing an eighth embodiment of this invention.

Next, an eighth embodiment of this invention will be described referring to FIG. 11.

In this embodiment, the directions of the tooth traces of the gears 3A, 3D and 3B of the fixed speed ratio transmission 3 of the seventh embodiment are reversed. The remaining features of the construction are identical to those of the seventh embodiment.

The thrust forces acting on the helical gears on the CVT output shaft 4 in this embodiment are summarized in the following Table 8.

TABLE 8

| | Gear 4A | IVT output Gear 7 | Ring gear 5C | Sun gear 5A | Output gear 3B |
|---|---|---|---|---|---|
| Thrust force | Fc | Fo | Fr | Fs | Fg |
| Tooth trace direction | left hand | right hand | right hand | left hand | left hand |
| Thrust force direction | negative | positive | negative | positive | positive |
| Torque transmission | driving | driving | driven | driven | driven |
| Rotation direction | clockwise | clockwise | clockwise | clockwise | clockwise |

In this embodiment also, the negative thrust force Fc acting on the gear 4A is transmitted to the structure. As a result, in the structure, the two negative thrust forces Fc, Fr cancel out the three positive thrust forces Fo, Fs, Fg. Therefore, the thrust force exerted by this structure on the CVT output shaft 4 is small, and the load on the bearing unit 15 is maintained at a low level.

Figure 12:
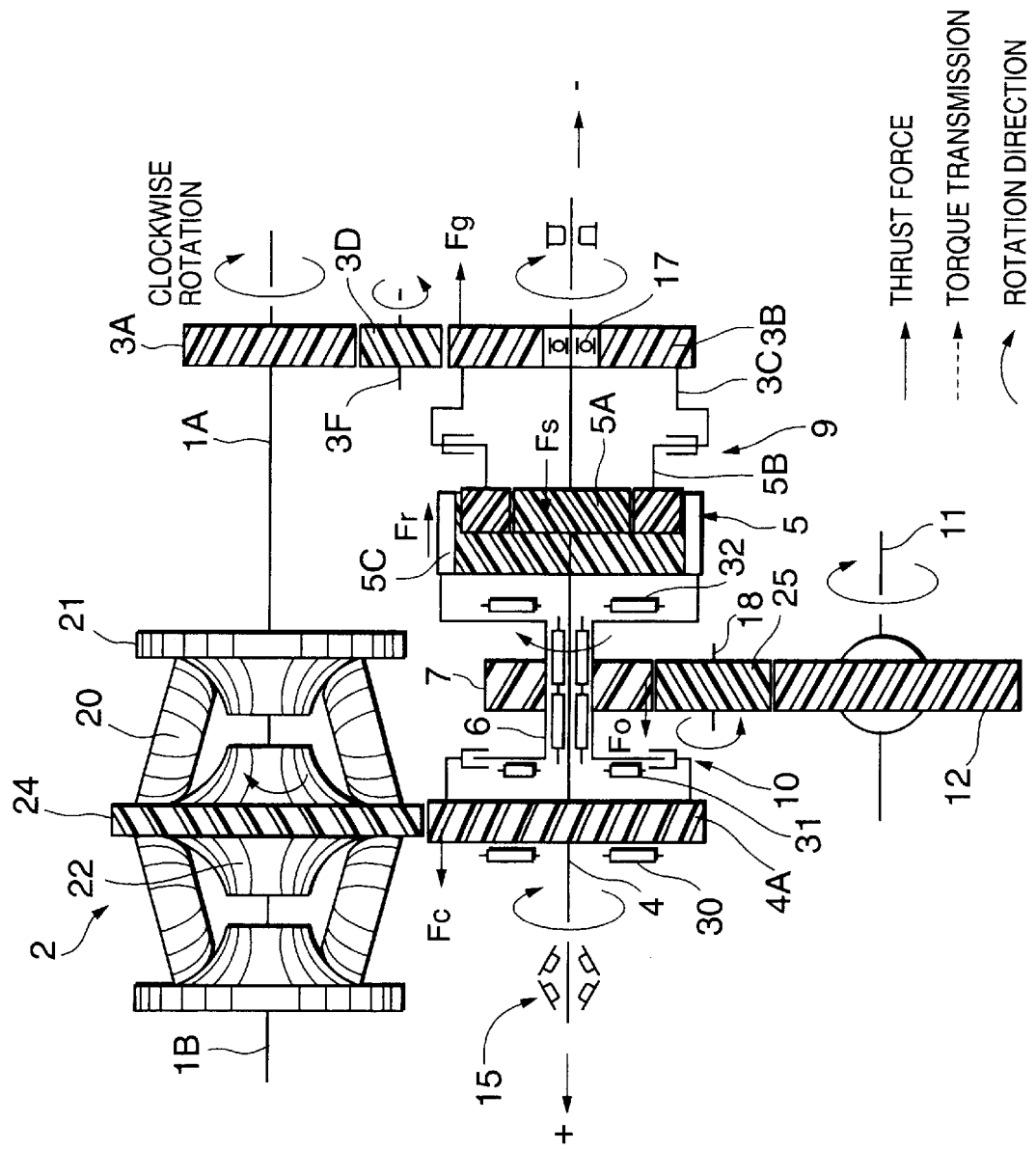
FIG. 12 is similar to FIG. 4, but showing a ninth embodiment of this invention.

Next, a ninth embodiment of this invention will be described referring to FIG. 12.

In this embodiment, the tooth trace of the gear 4A of the seventh embodiment is changed to right hand, and correspondingly, the tooth trace of the CVT output gear 24 is changed to left hand. The remaining features of the construction are identical to those of the seventh embodiment.

The thrust forces acting on the helical gears on the CVT output shaft 4 in this embodiment are summarized in the following Table 9.

TABLE 9

| | Gear 4A | IVT output Gear 7 | Ring gear 5C | Sun gear 5A | Output gear 3B |
|---|---|---|---|---|---|
| Thrust force | Fc | Fo | Fr | Fs | Fg |
| Tooth trace direction | right hand | right hand | right hand | left hand | right hand |
| Thrust force direction | positive | positive | negative | positive | negative |
| Torque transmission | driving | driving | driven | driven | driven |
| Rotation direction | clockwise | clockwise | clockwise | clockwise | clockwise |

In this embodiment, the two positive thrust forces Fo, Fs and two negative thrust forces Fr, Fg in the structure cancel out. Therefore, the thrust force exerted by the structure on the CVT output shaft 4 is small, and the load on the bearing unit 15 is maintained at a low level.

Further, since the thrust force Fo acting on the IVT output gear 7 and the thrust force Fr acting on the ring gear 5C cancel out each other, the needle bearings 31 and 32 supporting the final output shaft 6 do not suffer a concentration of the thrust forces.

The positive thrust force Fc acting on the gear 4A is supported by the casing 14 via the needle bearing 30 and oil retainer 60.

Figure 13:
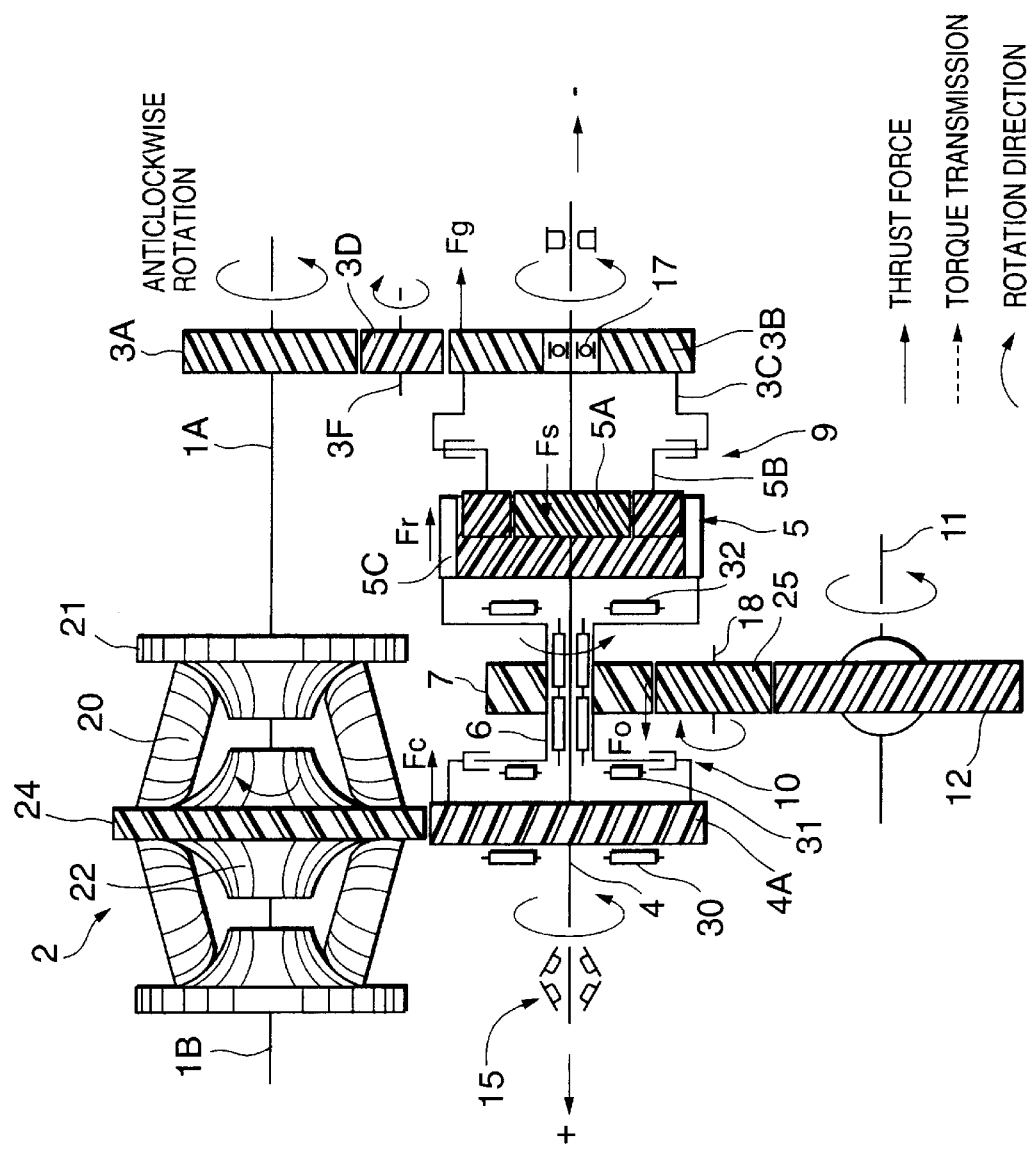
FIG. 13 is similar to FIG. 4, but showing a tenth embodiment of this invention.

Next, a tenth embodiment of this invention will be described referring to FIG. 13.

In this embodiment, the rotation directions of the shafts of the seventh embodiment are reversed, and the tooth traces of the helical gears are also reversed. The remaining features of the construction identical to those of the seventh embodiment.

The thrust forces acting on the helical gears on the CVT output shaft 4 in this embodiment are summarized in the following Table 10.

TABLE 10

| | Gear 4A | IVT output Gear 7 | Ring gear 5C | Sun gear 5A | Output gear 3B |
|---|---|---|---|---|---|
| Thrust force | Fc | Fo | Fr | Fs | Fg |
| Tooth trace direction | right hand | left hand | left hand | right hand | left hand |
| Thrust force direction | negative | positive | negative | positive | negative |
| Torque transmission | driving | driving | driven | driven | driven |
| Rotation direction | anti-clockwise | anti-clockwise | anti-clockwise | anti-clockwise | anti-clockwise |

In this embodiment, the directions of the thrust forces acting on the helical gears are identical to those of the seventh embodiment. Therefore, in this embodiment also, an identical effect to that of the seventh embodiment is obtained.

Figure 14:
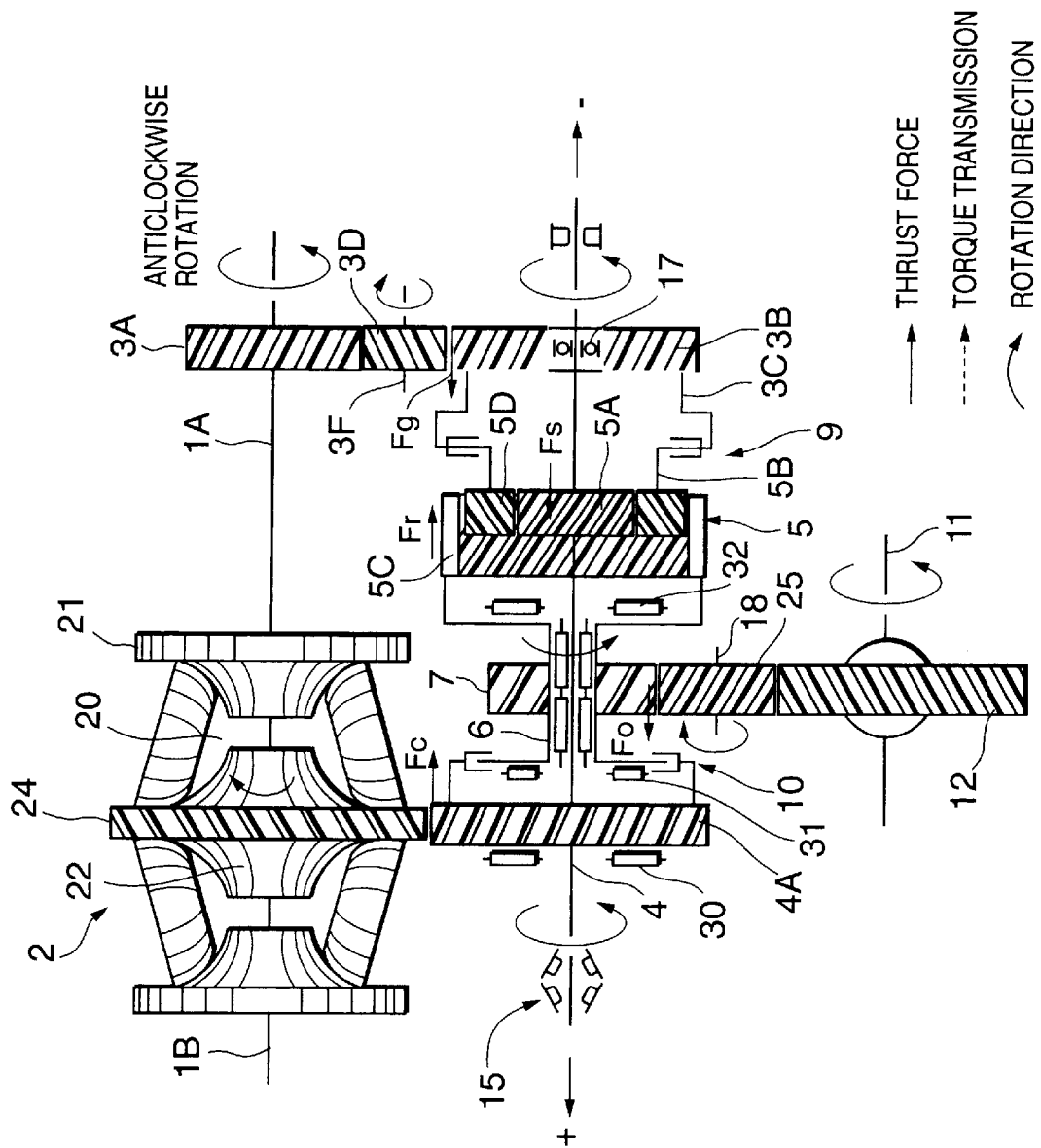
FIG. 14 is similar to FIG. 4, but showing an eleventh embodiment of this invention.

Next, an eleventh embodiment of this invention will be described referring to FIG. 14.

In this embodiment, the tooth traces of the input gear 3A, intermediate gear 3D and output gear 3B of the fixed speed ratio transmission 3 of the tenth embodiment are reversed. The remaining features of the construction identical to those of the tenth embodiment.

The thrust forces acting on the helical gears on the CVT output shaft 4 in this embodiment are summarized in the following Table 11.

TABLE 11

| | Gear 4A | IVT output Gear 7 | Ring gear 5C | Sun gear 5A | Ouput gear 3B |
|---|---|---|---|---|---|
| Thrust force | Fc | Fo | Fr | Fs | Fg |
| Tooth trace direction | right hand | left hand | left hand | right hand | right hand |
| Thrust force direction | negative | positive | negative | positive | positive |
| Torque transmission | driving | driving | driven | driven | driven |
| Rotation direction | anti-clockwise | anti-clockwise | anti-clockwise | anti-clockwise | anti-clockwise |

In this embodiment, the thrust forces acting on the helical gears are in the same direction as those of the eighth embodiment. Therefore, in this embodiment also, an identical effect to that of the eighth embodiment is obtained.

Figure 15:
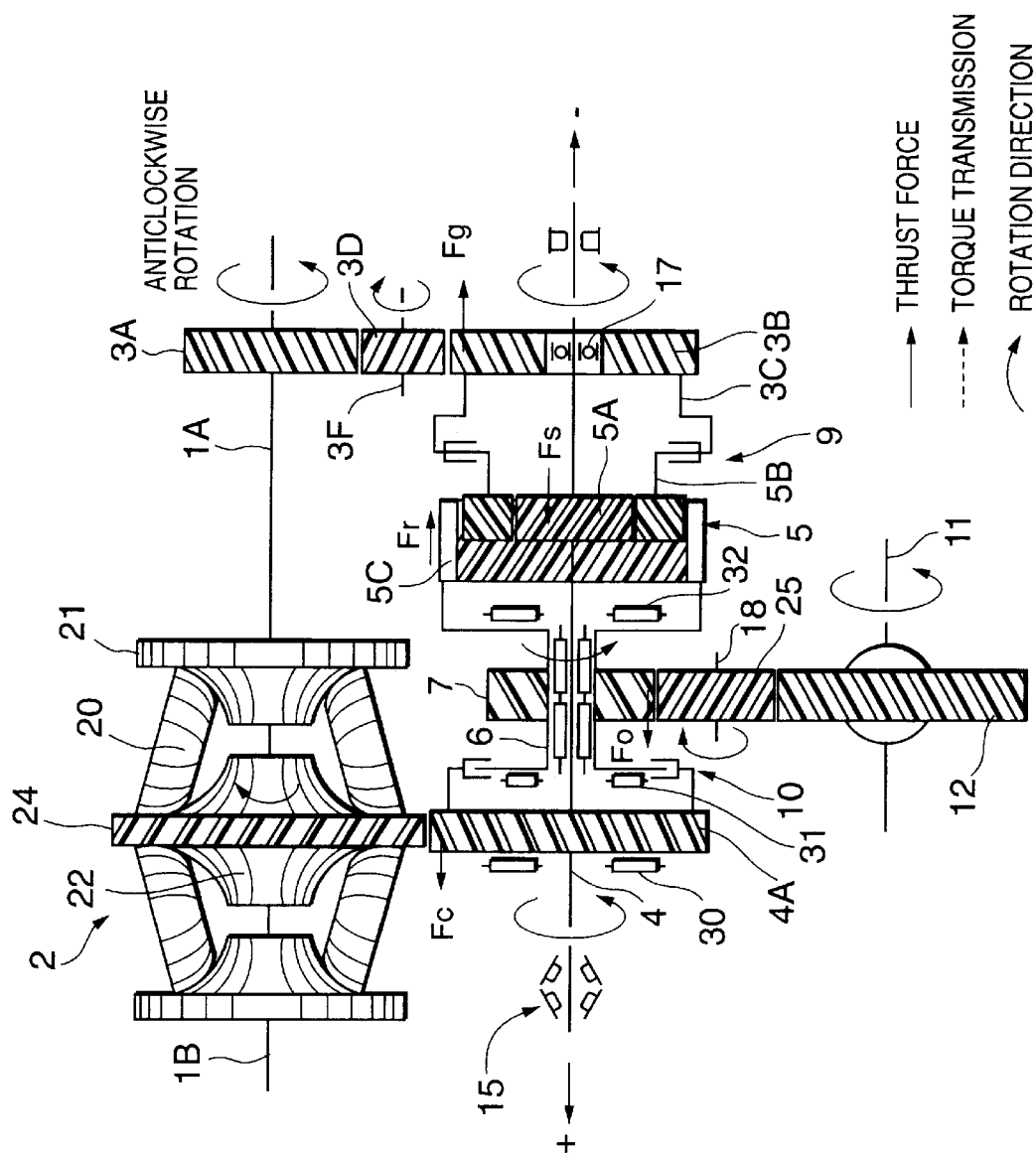
FIG. 15 is similar to FIG. 4, but showing a twelfth embodiment of this invention.

Next, a twelfth embodiment of this invention will be described referring to FIG. 15.

In this embodiment, the tooth trace of the gear 4A of the tenth embodiment is changed to left hand, and correspondingly, the tooth trace of the CVT output gear 24 is changed to right hand. The remaining features of construction are identical to those of the tenth embodiment.

The thrust forces acting on the helical gears on the CVT output shaft 4 in this embodiment are summarized in the following Table 12.

TABLE 12

|  | Gear 4A | IVT output Gear 7 | Ring gear 5C | Sun gear 5A | Ouput gear 3B |
| --- | --- | --- | --- | --- | --- |
| Thrust force | Fc | Fo | Fr | Fs | Fg |
| Tooth trace direction | left hand | left hand | left hand | right hand | left hand |
| Thrust force direction | positive | positive | negative | positive | negative |
| Torque transmission | driving | driving | driven | driven | driven |
| Rotation direction | anti-clockwise | anti-clockwise | anti-clockwise | anti-clockwise | anti-clockwise |

In this embodiment, the thrust forces acting on the helical gears are in the same directions as those of the ninth embodiment. Therefore, in this embodiment also, an identical effect to that of the ninth embodiment is obtained.

In this way, according to this invention, as the load on the bearing unit 15 is small, the durability of the bearing unit 15 can be improved and it can be made compact. Further, as the friction of the bearings is small, the power transmission efficiency of the IVT also improves.

The contents of Tokugan 2000-279993, with a filing date of Sep. 14, 2000 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in the above embodiments, the intermediate gear 3D for changing the rotation direction of a gear was installed in the fixed speed ratio transmission 3, but an intermediate gear may be installed between the CVT output shaft 24 and the gear 4A instead of the intermediate gear 3D.

The embodiments of this invention in which an exclusive property or privilege is claimed are defined as follows:

What is claimed is:

1. An infinitely variable transmission interposed between an engine and a drive shaft of a vehicle to transmit an engine torque to the drive shaft, comprising:

a first shaft joined to the engine;

a second shaft disposed parallel to the first shaft;

a fixed speed ratio transmission comprising a first rotation element supported on the second shaft which outputs the rotation of the first shaft at a fixed speed ratio;

a continuously variable transmission comprising a second rotation element supported on the second shaft which outputs the rotation of the first shaft at an arbitrary speed ratio, the first rotation element and second rotation element being supported free to rotate relative to each other;

a planetary gear set disposed between the first rotation element and the second rotation element, the planetary gear set comprising a sun gear comprising a helical gear joined to the second rotation element, a planet carrier joined to the first rotation element and a ring gear which comprises a helical gear varying a rotation direction and a rotation speed according to a rotation speed difference between the sun gear and the planet carrier, the planet carrier supporting a planet gear comprising a helical gear meshed with the sun gear and the ring gear, and revolving around the sun gear together with the planet carrier;

a final output gear comprising a helical gear joined to the ring gear and disposed between the planetary gear set and second rotation element; and a transmitting gear comprising a helical gear which meshes with the final output gear and transmits a rotation of the final output gear to the drive shaft, wherein the ring gear and the final output gear have tooth traces with which, when a torque is transmitted from the engine to the drive shaft, a thrust force exerted by the planet gear on the ring gear and a thrust force exerted by the transmitting gear on the final output gear act in opposite directions.

2. The infinitely variable transmission as defined in claim 1, wherein the infinitely variable transmission further comprises a connecting member which connects the ring gear and the final output gear, and the ring gear and the final output gear have the tooth traces with which, when a torque for driving the vehicle forward is transmitted from the engine to the drive shaft, the thrust force exerted by the planet gear on the ring gear and the thrust force exerted by the transmission gear on the final output gear act in a compression direction of the connecting member.

3. The infinitely variable transmission as defined in claim 2, wherein, the rotation direction of the first rotation element is clockwise when the second rotation element is viewed from the first rotation element in a state where the torque for driving the vehicle forward is transmitted from the engine to the drive shaft, the tooth trace of the ring gear is set to left hand, and the tooth trace of the final output gear is set to left hand.

4. The infinitely variable transmission as defined in claim 3, wherein the first rotation element comprises a helical gear, the fixed speed ratio transmission further comprises a third rotation element comprising a helical gear which meshes with the first rotation element to transmit a rotation of the first shaft to the first rotation element, the first rotation element is supported to be free to rotate on the second shaft while an axial displacement thereof is restricted, the sun gear is fixed to the second shaft, and the tooth trace of the first rotation element is set to left hand and the tooth trace of the sun gear is set to right hand.

5. The infinitely variable transmission as defined in claim 3, wherein, the rotation direction of the first rotation element is clockwise when the second rotation element is viewed from the first rotation element in the state where the torque for driving the vehicle forward is transmitted from the engine to the drive shaft, the tooth trace of the ring gear is set to right hand, and the tooth trace of the final output gear is set to right hand.

6. The infinitely variable transmission as defined in claim 5, wherein the first rotation element comprises a helical gear, the fixed speed ratio transmission further comprises a third rotation element comprising a helical gear which meshes with the first rotation element to transmit a rotation of the first shaft to the first rotation element, the first rotation element is supported to be free to rotate on the second shaft while an axial displacement thereof is restricted, the sun gear is fixed to the second shaft, and the tooth trace of the first rotation element is set to right hand and the tooth trace of the sun gear is set to left hand.

7. The infinitely variable transmission as defined in claim 2, wherein, the rotation direction of the first rotation element is anticlockwise when the second rotation element is viewed from the first rotation element in the state where the torque for driving the vehicle forward is transmitted from the engine to the drive shaft, the tooth trace of the ring gear is set to right hand, and the tooth trace of the final output gear is set to right hand.

8. The infinitely variable transmission as defined in claim 7, wherein the first rotation element comprises a helical gear, the fixed speed ratio transmission further comprises a third rotation element comprising a helical gear which meshes with the first rotation element to transmit a rotation of the first shaft to the first rotation element, the first rotation element is supported to be free to rotate on the second shaft while an axial displacement thereof is restricted, the sun gear is fixed to the second shaft, and the tooth trace of the first rotation element is set to right hand and the tooth trace of the sun gear is set to left hand.

9. The infinitely variable transmission as defined in claim 1, wherein the infinitely variable transmission further comprises a connecting member which connects the ring gear and the final output gear, and the ring gear and the final output gear have the tooth traces with which, when a torque for driving the vehicle forward is transmitted from the engine to the drive shaft, the thrust force exerted by the planet gear on the ring gear and the thrust force exerted by the transmitting gear on the final output gear act in an extension direction of the connecting member.

10. The infinitely variable transmission as defined in claim 9, wherein, the rotation direction of the first rotation element is anticlockwise when the second rotation element is viewed from the first rotation element in a state where a torque for driving the vehicle forward is transmitted from the engine to the drive shaft, the tooth trace of the ring gear is set to left hand, and the tooth trace of the final output gear is set to left hand.

11. The infinitely variable transmission as defined in claim 10, wherein the first rotation element comprises a helical gear, the fixed speed ratio transmission further comprises a third rotation element comprising a helical gear which meshes with the first rotation element to transmit a rotation of the first shaft to the first rotation element, the first rotation element is supported to be free to rotate on the second shaft while axial displacement thereof is restricted, the sun gear is fixed to the second shaft, and the tooth trace of the first rotation element is set to left hand and the tooth trace of the sun gear is set to right hand.

12. The infinitely variable transmission as defined in claim 1, wherein the fixed speed ratio transmission further comprises a third rotation element comprising a helical gear which meshes with the first rotation element to transmit a rotation of the first shaft to the first rotation element, and a fourth rotation element comprising a helical gear fixed to the first shaft which meshes with the third rotation element.

* * * * *